(12) United States Patent
Takita

(10) Patent No.: US 7,903,962 B2
(45) Date of Patent: Mar. 8, 2011

(54) IMAGE CAPTURING APPARATUS WITH AN ADJUSTABLE ILLUMINATION SYSTEM

(75) Inventor: Mark Takita, Menlo Park, CA (US)

(73) Assignee: Nikon Corporation, Tokyo (JP)

( * ) Notice: Subject to any disclaimer, the term of this patent is extended or adjusted under 35 U.S.C. 154(b) by 953 days.

(21) Appl. No.: 11/369,259

(22) Filed: Mar. 7, 2006

(65) Prior Publication Data

US 2007/0212052 A1    Sep. 13, 2007

(51) Int. Cl.
*G03B 15/03* (2006.01)
(52) U.S. Cl. ......................................................... 396/155
(58) Field of Classification Search .................. 345/426, 345/419; 382/299, 154, 254, 274; 348/E5.024, 348/E5.034, E5.038, E13.058, E5.143, E5.144, 348/371; 396/155, 201
See application file for complete search history.

(56) References Cited

U.S. PATENT DOCUMENTS

| | | | |
|---|---|---|---|
| 5,438,363 A | 8/1995 | Ejima et al. | |
| 2003/0001807 A1* | 1/2003 | Debiez et al. | 345/82 |
| 2003/0052992 A1* | 3/2003 | Nakata | 348/371 |
| 2003/0128542 A1* | 7/2003 | Pohlert et al. | 362/253 |
| 2004/0041941 A1 | 3/2004 | Takeshita | |
| 2005/0046739 A1* | 3/2005 | Voss et al. | 348/371 |
| 2005/0195290 A1 | 9/2005 | Takeshita | |
| 2005/0264685 A1 | 12/2005 | Hoshuyama | |

FOREIGN PATENT DOCUMENTS

JP    2004-282460    10/2004

OTHER PUBLICATIONS

The Nikon Guide to Digital Photography with the D2x Digital Camera by Nikon Corporation. The D2x digital camera was released on Feb. 25, 2005, 288 pages.
Proceedings of the 2004 IEEE Computer Society Conference on Computer Vision and Pattern Recognition (CVPR'04) 1063-6919/04, 8 pages.
Model No. GM 5WA06200Z by Sharp—Built-in 3-chip, Super-luminosity Chip LED, as of Apr. 2001, 2 pages.
http://optics.org/aticles/news/10/10/14/1 Dated Dec. 10, 2004, Lamina Ceramics LED array, 4 pages.
Luxeon Flash LXCL-PWF1—Technical Datasheet DS49. Dated Nov. 12, 2004, Lumileds Future Electronics, 14 pages.

* cited by examiner

*Primary Examiner* — Reena Aurora
(74) *Attorney, Agent, or Firm* — Roeder & Broder LLP

(57) ABSTRACT

An image capturing apparatus (10) for capturing an image (214) of a scene (12) includes an apparatus frame (222), a capturing system (226), and an illumination system (230). The capturing system (226) captures the image (214). The illumination system (230) can alternatively generate a first generated light beam (348A) having a first color composition (368A) and a second generated light beam (348B) having a second color composition (368B) that is different than the first color composition (368A). The scene (12) can have a first lighting condition (366A) or a second lighting condition (366B) that is different than the first lighting condition (366A). Further, the illumination system (230) generates the first generated light beam (348A) when the scene (12) has the first lighting condition (366A) and the illumination system (230) generates the second generated light beam (348B) when the scene (12) has the second lighting condition (366B). With this design, the color composition of the generated light beam (348A) (348B) can be tailored to suit the actual lighting condition (366A) (366B) of the scene (12).

20 Claims, 4 Drawing Sheets

Fig. 3A  Fig. 3B
Fig. 3C  Fig. 3D
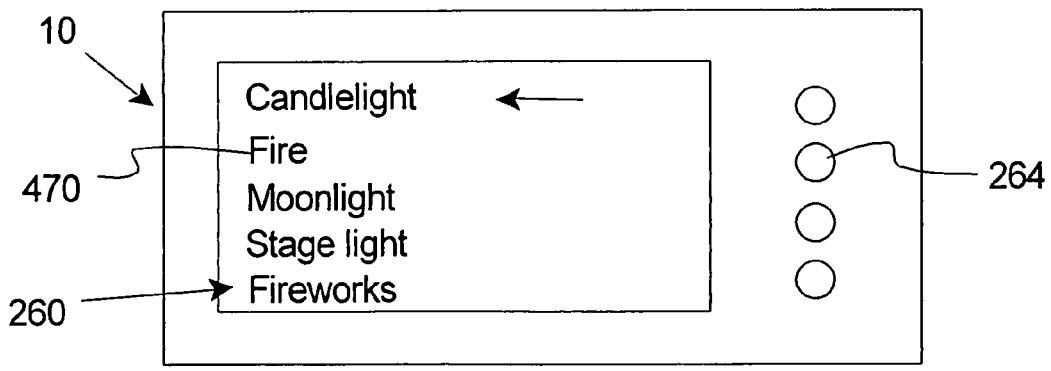
Fig. 4

IMAGE CAPTURING APPARATUS WITH AN ADJUSTABLE ILLUMINATION SYSTEM

BACKGROUND

Cameras are commonly used to capture an image of a scene. A typical camera includes a camera flash that emits a consistent, white light that illuminates the subject of the image. Quite often, the scene is already illuminated by off-white light sources that provide a special atmosphere or mood for the scene. For example, at night, the scene can be illuminated by one or more candles that emit colors other than "true" white light. The candles can provide a soft ambiance to the scene. Alternatively, for example, the scene may be lit by artificial light sources which contain unusual colors to create another type of atmosphere or mood, such as those used in stage lighting. Unfortunately, in certain designs, existing cameras are not able to accurately capture the special atmosphere or mood of the scene.

SUMMARY

The present invention is directed to an image capturing apparatus for capturing an image of a scene. The image capturing apparatus includes an apparatus frame, a capturing system, and an illumination system. The capturing system captures the image. In one embodiment, the illumination system alternatively generates a first generated light beam having a first color composition and a second generated light beam having a second color composition that is different than the first color composition.

The first color composition can be composed of a first intensity of red, a first intensity of green, and a first intensity of blue. Somewhat similarly, the second color composition can be composed of a second intensity of red, a second intensity of green, and a second intensity of blue.

In another embodiment, the illumination system alternatively also generates a third generated light beam having a third color composition that is different than the first and second color compositions.

The scene can have a first lighting condition or a second lighting condition that is different than the first lighting condition. Further, the illumination system generates the first generated light beam when the scene has the first lighting condition and the illumination system generates the second generated light beam when the scene has the second lighting condition. In another embodiment, the scene can also have a third lighting condition that is different than the first and second lighting conditions. In this embodiment, the illumination system generates the third generated light beam when the scene has the third lighting condition. With these designs, in certain embodiments, the color composition of the generated light beam can be tailored to suit the actual lighting condition of the scene. As a result thereof, the image captured can more realistically represent the actual mood or atmosphere of the scene.

In one embodiment, the image capturing apparatus includes a control system that determines whether the scene has the first lighting condition, the second lighting condition, or the third lighting condition. Further, the control system controls the illumination system to generate the first generated light beam if the scene has the first lighting condition, to generate the second generated light beam if the scene has the second lighting condition, and to generate the third generated light beam if the scene has the third lighting condition.

Additionally, or alternatively, the image capturing apparatus can include a selector that can be selectively controlled by a user of the image capturing apparatus. With this design, the selector allows the user to control the illumination system to selectively generate the first generated light beam, the second generated light beam, or the third generated light beam depending upon the lighting condition of the scene. Alternatively, the user can use the selector to select between the generated light beams to achieve the desired colors in the captured image.

In one embodiment, each of the generated light beams includes at least one of the primary colors. In another embodiment, each of the generated light beams includes at least two of the primary colors. In yet another embodiment, each of the generated light beams includes the three primary colors. For example, the illumination system can include a red LED, a blue LED, and a green LED that can each be selectively controlled to selectively control the color composition of the generated beams.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIGS. 3A-3D illustrate four separate scenes and a generated light beam for each scene;

FIG. 4 is a rear view of one embodiment of the image capturing apparatus; and

DESCRIPTION

Figure 1:
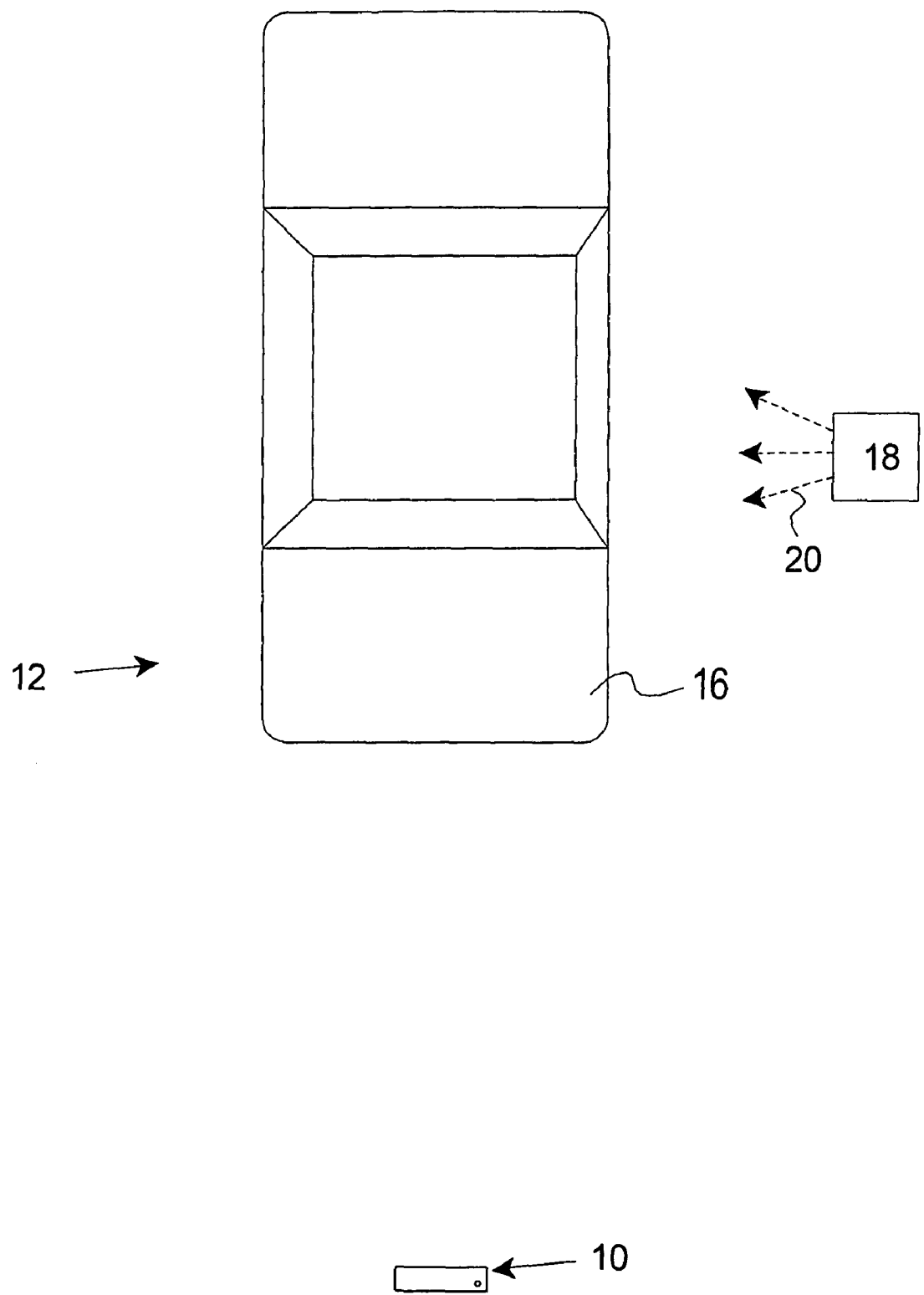
FIG. 1 is a simplified top plan view of a scene and an image capturing apparatus having features of the present invention.

FIG. 1 is a simplified top plan illustration of an image capturing apparatus 10 having features of the present invention and a scene 12. The image capturing apparatus 10 is useful for capturing an image 214 (illustrated in FIG. 2B) of the scene 12. The type of scene 12 captured by the image capturing apparatus 10 can vary. For example, the scene 12 can include one or more people, animals, items, objects, and/or environments. In FIG. 1, the scene 12 includes a car 16.

Further, in FIG. 1, the scene 12 is at least partly illuminated by a light source 18 that can cooperate with other light sources (not shown) to create a lighting condition for the scene 12. In one embodiment, the light source 18 generates light 20 (illustrated as arrows) that include colors other than white (e.g. red, blue, and green) which creates atmosphere or mood for the scene 12. For example, the light source 18 can be an electric light source, e.g. a stage light that generates light 20 that is composed of some combination of red, blue and/or green. With this design, the stage light creates a first lighting condition for the scene 12.

Alternatively, for example, the light source 18 can be a candle that creates a second lighting condition for the scene 12, a lantern that creates a third lighting condition for the scene 12, or a campfire that creates a fourth lighting condition for the scene 12. Still alternatively, the scene 12 can be illuminated by natural sources of light that create atmosphere or mood for the scene 12, such as the sun near sunset that creates a fifth lighting condition for the scene 12, and/or sunlight reflected off of the moon that creates a sixth lighting condition for the scene 12. It should be noted that the light sources and the lighting conditions provided herein are merely non-exclusive examples of possible light sources and lighting conditions.

The image capturing apparatus 10 can be any device capable of capturing the image 214, including (i) a digital camera that electronically stores the image 214, (ii) a conventional film type camera that records the scene 12 on a photosensitive film or plate, and/or (iii) a video recording device that electronically records still or moving images 214. As provided herein, in certain embodiments, the image capturing apparatus 10 is better adapted to capture the atmosphere or mood of the scene 12.

In one embodiment, the image capturing apparatus 10 is water resistant and able to capture images while under water.

Figure 2A:
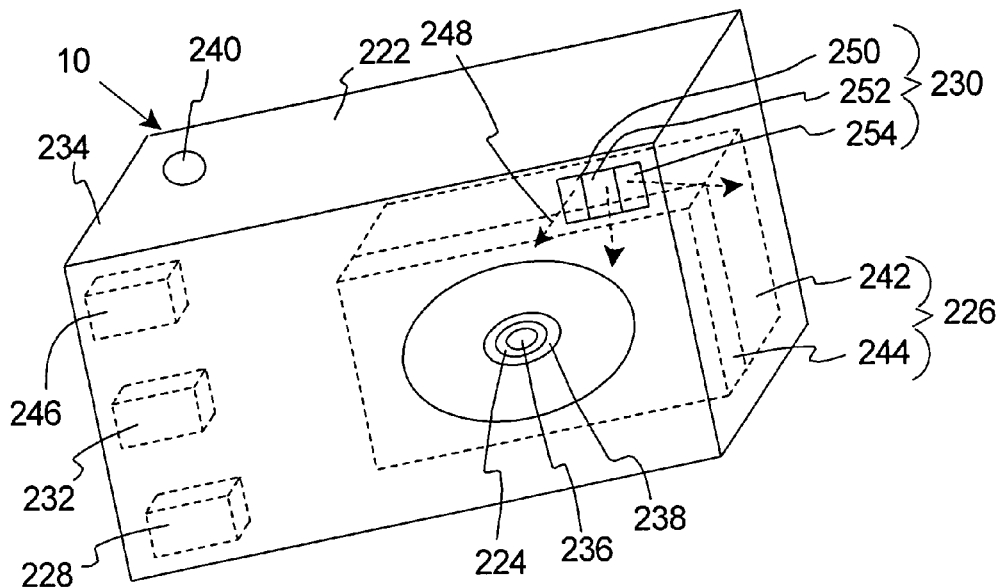
FIG. 2A is a simplified front perspective view of one embodiment of the image capturing apparatus.

FIG. 2A illustrates a simplified, front perspective view of one, non-exclusive embodiment of the image capturing apparatus 10. In this embodiment, the image capturing apparatus 10 is a camera that includes an apparatus frame 222, an optical assembly 224, a capturing system 226 (illustrated as a box in phantom), a power source 228 (illustrated as a box in phantom), an illumination system 230, and a control system 232 (illustrated as a box in phantom). The design of these components can be varied to suit the design requirements and type of image capturing apparatus 10.

The apparatus frame 222 can be rigid and support at least some of the other components of the image capturing apparatus 10. In one embodiment, the apparatus frame 222 includes a generally rectangular shaped hollow body 234 that forms a cavity that receives and retains at least a portion of the capturing system 226.

Additionally, the apparatus frame 222 can include an aperture 236 and a shutter mechanism 238 that work together to control the amount of light that reaches the capturing system 226. For example, the aperture 236 is a substantially circular opening in the front of the body 234 that helps to control the amount of light that reaches the capturing system 226. The beams of light that bounced off the object(s) of the scene 12 (illustrated in FIG. 1) can be directed into the body 234 through the aperture 236. To increase the amount of light that ultimately gets focused on the capturing system 226 the size of the aperture 236 can be increased. Conversely, to decrease the amount of light that gets focused on the capturing system 226 the size of the aperture 236 can be decreased.

The shutter mechanism 238 can include a pair of shutter shades positioned between the optical assembly 224 and the capturing system 226 and a shutter button 240 that activates the shutter shades. The shutter shades work in conjunction with each other to allow the light to be focused on the capturing system 226 for a certain amount of time. Before capturing an image 214, the first shutter shade is closed so no light will be focused on the image capturing system 226. When the shutter button 240 is pressed, the first shutter shade slides open to allow light to be focused on the capturing system 226. After a certain preset amount of time, the second shutter shade slides closed so as to prevent further light from being focused on the capturing system 226.

The amount of time that the shutter mechanism 238 permits the light to pass through the aperture 236 is commonly referred to as the shutter speed. A slow shutter speed means that the shutter mechanism 238 is open for a relatively long period of time, thereby allowing a greater amount of light to be captured and ultimately focused on the capturing system 226. Slow shutter speeds are commonly used when the amount of light available outside the body of the camera is relatively low. Conversely, a fast shutter speed means that the shutter mechanism 238 is open for a relatively short period of time, thereby allowing less light to be captured and ultimately focused on the capturing system 226. Fast shutter speeds are commonly used to minimize the effect of movement of the object(s) in the scene 12.

The optical assembly 224 is secured to the body 234 near the aperture 236. The optical assembly 224 can include a single lens or a combination of lenses that work in conjunction with each other to focus light onto the capturing system 226. The optical assembly 224 focuses the light that passes through the aperture 236 onto the capturing system 226.

The distance between the optical assembly 224 and the capturing system 226, commonly referred to as the focal length, can be adjusted to control how much light is ultimately focused on the capturing system 226. As the focal length decreases, the corresponding image 214 that is created at the capturing system 226 gets smaller. Conversely, as the focal length increases, the magnification of the image 214 also increases and the object(s) being captured appear to get closer.

The capturing system 226 captures the image 214, is positioned within the apparatus frame 222, and is coupled to the apparatus frame 222. The design of the capturing system 226 can vary according to the type of image capturing apparatus 10. For example, for a conventional film type camera, the capturing system 226 includes a piece of film. In this design, light focused on the film causes a chemical reaction which results in the image 214 being formed on the film. Alternatively, as illustrated in FIG. 2A, for a digital type camera, the capturing system 226 includes an image sensor 242, a filter assembly 244, and a storage system 246.

The image sensor 242 receives the light that passes through the aperture 236 and converts the light into electricity. The type of image sensor 242 can vary. One non-exclusive example of an image sensor 242 for digital cameras is known as a charge coupled device ("CCD"). A CCD consists of an integrated circuit containing an array of tiny, light-sensitive photosites or pixels, which are capable of accumulating varying amounts of charge in proportion to the amount of light they receive. A CCD can contain thousands or even millions of these photosites, each of which is individually light-sensitive.

When the beams of light strike the surface of the CCD, it frees up electrons to move around, and the CCD reads the accumulated charge that is produced at each photosite. The CCD, because the accumulated charge at each photosite is read in analog form, further employs the use of an analog-to-digital converter, or ADC, which converts the value of the accumulated charge at each photosite into a digital value. The overall effect of the operation of the CCD and ADC is the formation of a digital grayscale image that corresponds to how much light has fallen on each photosite. The amount of detail that is captured within such an image formed through use of a CCD is referred to as resolution, and resolution is measured by the number of photosites or pixels on the surface of the CCD. By way of example, a CCD which contains an array of one million photosites is referred to as having 1.0 megapixels. The more photosites present within the CCD, the more detail the camera can capture and the larger pictures can be printed without becoming blurry.

An alternative image sensor 242 that may be employed in digital cameras uses complementary metal oxide semiconductor ("CMOS") technology. CMOS devices use several transistors at each photosite to amplify and move the charge using more traditional wires.

As noted above, the image sensor 242, by itself, produces a grayscale image as it only keeps track of the total intensity of the light that strikes the surface of the image sensor 242. Accordingly, in order to produce a full color image, the filter assembly 244 (illustrated as a box in phantom) is necessary to recreate the image 214 with its true colors. The filter assembly 244 is able to recreate the true colors of the image 214 by focusing on and capturing the three primary colors, red, blue and green.

The filter assembly 244 can be positioned directly in front of the image sensor 242. While there are several methods for capturing the three primary colors in a digital camera, the most common filter assembly 244 used in digital cameras is a bayer filter or bayer mask. A bayer filter has an essentially checkerboard pattern that alternates between rows of red and green filters with rows of blue and green filters. By placing the bayer filter directly in front of the image sensor 242, each square of four pixels has one filtered red, one filtered blue, and two filtered green (as the human eye is more sensitive to green than either red or blue). The unconverted output from the image sensor 242 employing a bayer filter is a mosaic of green, red and blue photosites of different intensities. The camera then uses specialized algorithms to convert this mosaic into a mosaic that exhibits the true colors as captured from the object(s) being photographed.

It should be noted that other designs for the capturing system 226 can be utilized.

It should also be noted, as discussed in more detail below, that with information from the capturing system 226, the control system 232 can determine the predominant colors of the lighting condition of the scene 12. For example, the control system 232 can basically function as a spectral analyzer that determines the predominant colors.

The storage system 246 stores the various images 214 before the images 214 are ultimately printed out, deleted, transferred or downloaded to another system (not shown), such as a computer, an auxiliary storage system or a printer. The storage system 246 can be fixedly or removable coupled to the apparatus frame 222. Non-exclusive examples of suitable storage systems 246 include flash memory, a floppy disk, a hard disk, or a writeable CD or DVD. Further, the amount of storage space within the storage system 246 can vary greatly depending upon the specific storage system 246 chosen.

The power source 228 provides electrical power to the electrical components of the image capturing apparatus 10. For example, the power source 228 can include one or more chemical batteries, either the one time use disposable batteries (such as alkaline, zinc-air), or the multiple use rechargeable batteries (such as nickel-cadmium, nickel-metal-hydride, lead-acid, lithium-ion).

Often times images 214 are taken in an atmosphere where sufficient natural or artificial light is present so as to enable the production of a high quality and easily discernible image. However, other times images 214 are taken in an atmosphere which provides limited amounts of lighting where the illumination system 230 may be required. If needed, the illumination system 230 can provide a generated light beam 248 (e.g. a flash of light) that can be used to illuminate at least a portion of the scene 12.

The design of the illumination system 230 can vary according to the teachings provided herein. In one embodiment, the illumination system 230 can precisely adjust the color content of the generated light beam 248 to suit the lighting condition of the scene 12 being captured. For example, the illumination system 230 can precisely adjust the color content of the generated light beam 248 to mimic the color content of the illuminating light in a portion or all of the scene 12. Alternatively, the illumination system 230 can precisely adjust the color content of the generated light beam 248 to achieve the desired image 214 and/or to provide the appropriate or desired atmosphere, setting or mood for the image 214.

In one embodiment, the generated light beam 248 includes at least one of the primary colors, namely red, blue and green. For example, in alternative embodiments, the illumination system 230 can generate a generated light beam 248 that includes two or all three of the primary colors.

In one embodiment, the illumination system 230 includes a red light emitting diode ("LED") 250, a blue LED 252, and a green LED 254 that can be selectively and individually controlled and tuned to produce a generated light beam 248 that is red, blue, green, or potentially millions of other colors using different intensities for the LEDs 250, 252, 254. The LEDs 250, 252, 254 can be placed side by side or the LEDs 250, 252, 254 can be integrated together. Alternatively, the illumination system 230 can be another type of device that includes a red light source, a blue light source and a green light source and/or is capable of generating a light beam 248 that include red, blue and green colors.

In alternative, non-exclusive embodiments, the illumination system 230 can be controlled to selectively and alternatively produce 2, 5, 10, 20, 50, 100, 500, 1000, or 1,000,000 different generated light beams 248 with each generated light beam 248 having a different color composition.

The illumination system 230 can be coupled to the apparatus frame 222. For example, the illumination system 230 can be fixedly mounted to the apparatus frame 222, positioned at least partly within the apparatus frame 222, removably affixed to the apparatus frame 222 and/or usable spaced apart from the apparatus frame 222.

The control system 232 is electrically connected to and controls the operation of the electrical components of the image capturing apparatus 10. For example, the control system 232 is electrically connected to the illumination system 230 and controls the operation of the illumination system 230 to precisely control the timing and color content of the generated light beam 248. The control system 24 can include one or more processors and circuits.

In one embodiment, the control system 232 activates the illumination system 230 at the appropriate time so that the desired image 214 is captured. For example, the control system 232 can direct power to the illumination system 230, to produce the generated light beam 248 substantially simultaneously as the image 214 is being captured.

Additionally, the control system 232 can control the illumination system 230 to adjust the color content of the generated light beam 248. As an example, the control system 232 can direct power to the LEDs 250, 252, 254 at different levels so that the LEDs 250, 252, 254 illuminate at the desired intensities and the desired color content of the generated light beam 248 is generated.

Moreover, the control system 232 can receive information from the capturing system 226 regarding the color content of a portion or all of the scene 12 just prior to capturing the image 214. In non-exclusive examples, the control system 232 can be capable of selectively and alternatively determining 2, 5, 10, 20, 50, 100, 500, 1000, 1,000,000, or any number there between, different lighting conditions of the scene 14. In certain embodiments, the illumination system 230 disclosed herein can produce any color limited to the fineness of the intensity control of each LEDs 250, 252, 254.

As an example, the control system 232 can determine whether the image 214 is subjected to the first lighting condition, the second lighting condition, or the third lighting condition. With this information, the control system 232 can control the illumination system 230 (i) to generate the first generated light beam if the image 214 is subjected to the first lighting condition, (ii) to generate the second generated light beam if the image 214 is subjected to the second lighting condition, or (iii) to generate the third generated light beam if the image 214 is subjected to the third lighting condition. Stated in another fashion, with information regarding the color content of the scene 12 just prior to capturing the image 214, the control system 232 can control the illumination system 230 to mimic the measured colors and cause the generated light beam 248 to fill the scene 12 utilizing the same-colors or other colors that may enhance the image 214.

In this embodiment, the image capturing apparatus 10 can include an automatic compensation mode in which the control system 232 determines the color content of the scene 12 and automatically creates the correct color composition for the generated light beam for capturing the image 214.

In the automatic compensation mode, in one embodiment, the control system 232 can determine the color content of the scene 12 and cause the illumination system 230 to generate a generated light beam having a color composition that closely approximates the color content of the scene 12. Alternatively, the control system 232 can cause the illumination system 230 to generate a generated light beam having a color composition that complements the color content of the scene 12, and/or enhances the color content of the scene 12.

In one embodiment, the control system 232 is coupled to the apparatus frame 222 and is positioned within the apparatus frame 222.

Additionally, or alternatively, the image capturing apparatus 10 can include a separate sensor that measures the lighting condition of at least a portion of the scene 12 prior to capturing the image 214 and triggering the illumination system 230. The information from the separate sensor can be transferred to the control system 232 so that the control system 232 can precisely control the operation of the illumination system 230. It should be noted that these functions can also be performed by the image sensor 242.

Figure 2B:
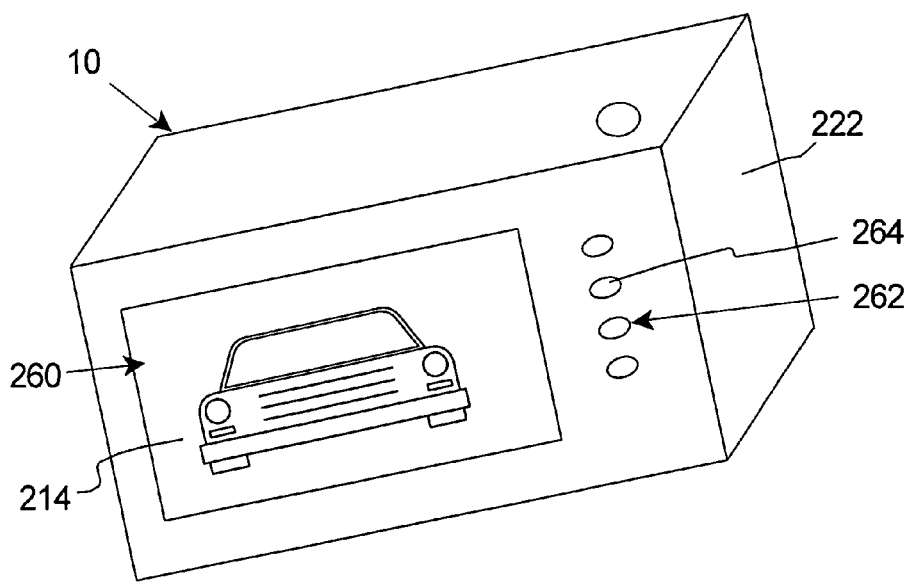
FIG. 2B is a simplified rear perspective view of the image capturing apparatus of FIG. 2A.

Referring to FIG. 2B, additionally, the image capturing apparatus 10 can include an image display 260 that displays the image 214 that is being captured. With this design, the user can decide which images 214 should be stored in the storage system 246 and which images 214 should be deleted. For example, the image display 260 can be fixedly mounted to the apparatus frame 222 on the back side. Alternatively, the image display 260 can be secured to the apparatus frame 222 with a hinge mounting system (not shown) that enables the display to be pivoted away from the apparatus frame 222. One non-exclusive example of an image display includes an LCD screen.

Moreover, the image capturing apparatus 10 can include one or more control switches 262 electrically connected to the control system 232 (illustrated in FIG. 2A) that allow user to control the functions of the image capturing apparatus 10. For example, the control switches 262 can be used to turn on and off the apparatus 10, delete images 214, focus the image 214, and many other functions. Additionally, one or more of the control switches 262 can be a selector 264 that is used to adjust the color content of the generated light beam 248 (illustrated in FIG. 2A). With this design, the user can manually adjust and control the color content of the generated light beam 248 to achieve the desired captured image 214. For example, the user can adjust the color content of the generated light beam 248 to achieve the desired image 214 and/or to provide the appropriate or desired atmosphere, setting, or mood for the image 214. In this embodiment, the image capturing apparatus 10 can include a manual compensation mode in which the user determines the color content of the scene 12, and adjusts the control system 232 to create the correct color composition for the generated light beam for capturing the image 214.

Additionally, the color composition of the generated light beam could be displayed on the image display 260 to assist the user. This will allow the user to adjust and modify the color composition of the generated light beam.

FIGS. 3A-3D illustrate four separate, non-exclusive lighting conditions 366A-366D for four different scenes 312A-312D and that the image capturing apparatus 10 generates a different generated light beam 348A-348D for each lighting condition 366A-366D. More specifically, referring to FIG. 3A, the scene 312A has a first lighting condition 366A and the image capturing apparatus 10 generates a first generated light beam 348A having a first color composition 368A. Further, referring to FIG. 3B, the scene 312B has a second lighting condition 366B and the image capturing apparatus 10 generates a second generated light beam 348B having a second color composition 368B. Moreover, referring to FIG. 3C, the scene 312C has a third lighting condition 366C and the image capturing apparatus 10 generates a third generated light beam 348C having a third color composition 368C. Finally, referring to FIG. 3D, the scene 312D has a fourth lighting condition 366D and the image capturing apparatus 10 generates a fourth generated light beam 348D having a fourth color composition 368D.

Referring to FIGS. 3A-3D, each of the lighting conditions 366A-366D is different from the other lighting conditions 366A-366D and the color composition 368A-368D of each generated light beam 348A-348D is different. For example, (i) the first color composition 366A of the first generated light beam 348A has more green G than red R or blue B and the first color composition 366A can be expressed as 100R(red)+200G(green)+80B(blue), (ii) the second color composition 366B of the second generated light beam 348B has more blue B than red R or green G, and the second color composition 366B can be expressed as 70R(red)+100G(green)+200B(blue), (iii) the third color composition 366C of the third generated light beam 348C has more red R than green G or blue B, and the third color composition 366C can be expressed as 250R(red)+90G(green)+50B(blue), and (iv) the fourth color composition 366D of the fourth generated light beam 348D has approximately equal amounts of green G, red R and blue B and the fourth color composition 366D can be expressed as 160R(red)+160G(green)+160B(blue). It should be noted that the numbers for red, green and blue above are the tonal values on a scale of 0 to 255. Further, for example, a color composition 255R(red)+255G(green)+255B(blue) is pure white a color composition of 0R(red)+0G(green)+0B(blue) is pure black, and a color composition of 127R(red)+127G(green)+127B(blue) is middle grey.

It should be noted that each of the lighting conditions 366A-366D can be caused by a separate light source 18 (illustrated in FIG. 1). In non-exclusive examples, each of the lighting conditions 366A-366D can be caused by one or more stage lights, fireworks, candles, lanterns, or a campfire. Still alternatively, one or more of the lighting conditions 366A-366D can be caused by the sun near sunset, and/or sunlight reflected off of the moon. It should be noted that the light sources and the lighting conditions 366A-366D provided herein are merely non-exclusive examples of possible light sources and lighting conditions 366A-366D.

Additionally, it should be noted that if the image capturing apparatus 10 is in the automatic compensation mode, the control system 232 (illustrated in FIG. 2A) can evaluate the lighting conditions 366A-366D and control the color content of the generated light beams 348A-348D accordingly. Alternatively, for example, if the image capturing apparatus 10 is in the manual compensation mode, user can evaluate the lighting conditions 366A-366D and adjust the control system 232 to control the color content of the generated light beams 348A-348D.

FIG. 4 is a rear view of one embodiment of the image capturing apparatus 10 that illustrates the manual compensation mode in more detail. More specifically, FIG. 4 illustrates that the image display 260 can also display a number of different potential lighting conditions 470 that the scene may have. With this design, the user can use the selector 264 to move a cursor to select one of the potential lighting conditions 470 that best matches the actual lighting condition 366A-366D (illustrated in FIGS. 3A-3D) of the scene 312A-312D (illustrated in FIGS. 3A-3D). Alternatively, the user can use the selector 264 to select one of the potential lighting conditions 470 to create the desired atmosphere or mood for the resulting image 214 (illustrated in FIG. 2B).

After the manual selection of the potential lighting conditions 470, the control system 232 (illustrated in FIG. 2A) controls the color content of resulting the generated light beams 348A-348D (illustrated in FIGS. 3A-3D).

Non-exclusive examples of potential lighting conditions 470 include candlelight, fire, moonlight, stage light, and fireworks.

Figure 5:
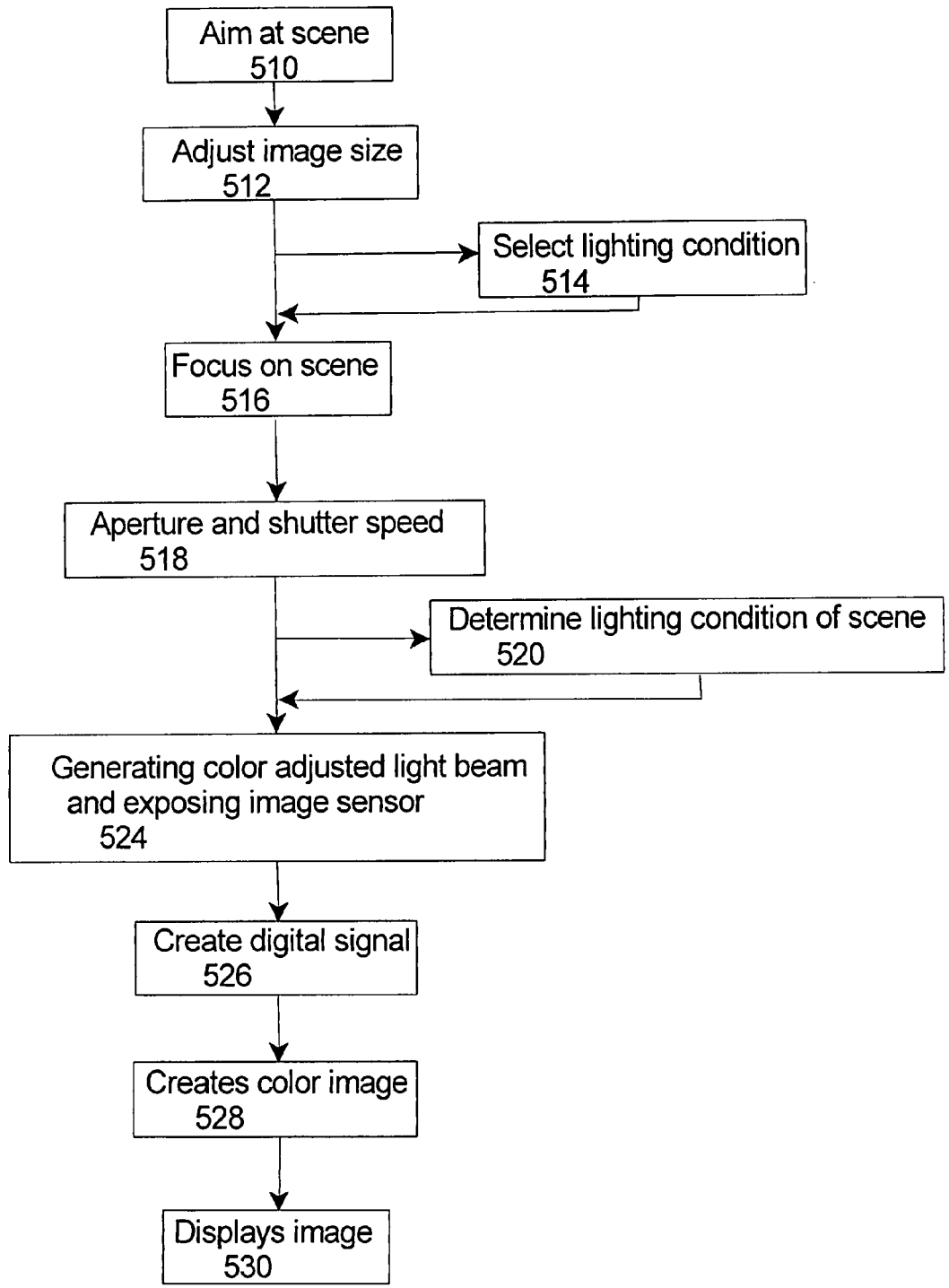
FIG. 5 is a simplified flowchart that illustrates one example of the operation of the image capturing apparatus.

FIG. 5 is a simplified flowchart that illustrates one non-exclusive example of the operation of the image capturing apparatus. First, the image capturing apparatus is aimed toward the scene 510. Second, the user adjusts the zoom so as to adjust the size of the image as desired 512. If the image capturing apparatus is in the manual compensation mode, the user selects one of the potential lighting conditions from the display 514. Next, the user presses lightly on the shutter button to enable the image capturing apparatus to automatically focus on the object(s) and monitor the available light 516. Subsequently, the image capturing apparatus sets the aperture and shutter speed 518. Next, if the image capturing apparatus is in the automatic lighting condition mode, the control system determines the lighting condition of the scene and the composition of the generated light beam 520. Subsequently, the user presses the shutter button all the way, which resets the image sensor, causes the illumination system to generate the color adjusted light beam, and opens the first shutter shade thereby exposing the image sensor to light, building up an electrical charge until the second shutter shade closes thereby preventing further light from reaching the image sensor 524. Next, the ADC measures the charge at each photosite of the image sensor and creates a digital signal that represents the values of the charge at each photosite 526. Subsequently, the control system interpolates the data from the different photosites, with assistance from the filtering component, to create the color image 528. Finally, the image is displayed on the image display 530.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. An image capturing apparatus for capturing an image of a scene, the image capturing apparatus comprising:
    an apparatus frame;
    a capturing system for capturing the image, the capturing system being secured to the apparatus frame;
    an illumination system coupled to the apparatus frame, the illumination system alternatively generating a first generated light beam having a first color composition and a second generated light beam having a second color composition that is different than the first color composition; and
    a control system that determines whether the scene includes a first lighting condition or a second lighting condition, wherein when the scene includes the first lighting condition the control system controls the illumination system so that the first color composition of the first generated light beam mimics a first color content of the first lighting condition, and wherein when the scene includes the second lighting condition the control system controls the illumination system so that the second color composition of the second generated light beam mimics a second color content of the second lighting condition.

2. The image capturing apparatus of claim 1 wherein each of the generated light beams includes at least one of the primary colors.

3. The image capturing apparatus of claim 1 wherein each of the generated light beams includes at least two of the primary colors.

4. The image capturing apparatus of claim 1 wherein each of the generated light beams includes the three primary colors.

5. The image capturing apparatus of claim 4 wherein the illumination system includes a red LED, a blue LED, and a green LED that can each be selectively controlled.

6. The image capturing apparatus of claim 1 further comprising a selector that can be selectively controlled by a user of the image capturing apparatus, the selector allowing the user to control the illumination system to selectively generate the first generated light beam or the second generated light beam.

7. The image capturing apparatus of claim 1 wherein the first lighting condition includes at least one of candlelight, fire, moonlight, stage light and fireworks, and wherein the second lighting condition includes at least one of candlelight, fire, moonlight, stage light and fireworks, the first lighting condition being different than the second lighting condition.

8. The image capturing apparatus of claim 1 wherein the illumination system alternatively generates a third generated light beam having a third color composition that is different than the first and second color compositions, wherein the control system determines whether the scene includes a third lighting condition, and wherein when the scene includes the third lighting condition the control system controls the illumination system so that the third color composition of the third generated light beam mimics a third color content of the third lighting condition.

9. The image capturing apparatus of claim 8 further comprising a selector that can be selectively controlled by a user of the image capturing apparatus, the selector allowing the user to control the illumination system to selectively generate the first generated light beam, the second generated light beam or the third generated light beam.

10. The image capturing apparatus of claim 8 wherein the first lighting condition includes at least one of candlelight, fire, moonlight, stage light and fireworks, wherein the second lighting condition includes at least one of candlelight, fire, moonlight, stage light and fireworks, the first lighting condition being different than the second lighting condition, and wherein the third lighting condition includes at least one of candlelight, fire, moonlight, stage light and fireworks, the third lighting condition being different than the first lighting condition and the second lighting condition.

11. A method for capturing an image of a scene, the method comprising the steps of:

providing an apparatus frame;

capturing the image with a capturing system, the capturing system being secured to the apparatus frame;

selectively generating with an illumination system a first generated light beam having a first color composition and a second generated light beam having a second color composition that is different than the first color composition; and determining whether the scene includes a first lighting condition or a second lighting condition with a control system, wherein when the scene includes the first lighting condition the control system controls the illumination system so that the first color composition of the first generated light beam mimics a first color content of the first lighting condition, and wherein when the scene includes the second lighting condition the control system controls the illumination system so that the second color composition of the second generated light beam mimics a second color content of the second lighting condition.

12. The method of claim 11 wherein each of the generated light beams includes at least one of the primary colors.

13. The method of claim 11 wherein each of the generated light beams includes at least two of the primary colors.

14. The method of claim 11 wherein each of the generated light beams includes the three primary colors.

15. The method of claim 11 further comprising the step of providing a selector that can be used by a user to select between the first color composition and the second color composition.

16. The method of claim 11 wherein the step of selectively generating with an illumination system includes selectively generating a third generated light beam having a third color composition that is different than the first and second color compositions, and wherein the step of determining includes determining whether the scene includes a third lighting condition with the control system, wherein when the scene includes the third lighting condition the control system controls the illumination system so that the third color composition of the third generated light beam mimics a third color content of the third lighting condition.

17. The method of claim 11 wherein the step of determining includes the first lighting condition including at least one of candlelight, fire, moonlight, stage light and fireworks, and the second lighting condition including at least one of candlelight, fire, moonlight, stage light and fireworks, the first lighting condition being different than the second lighting condition.

18. An image capturing apparatus for capturing an image of a scene, the image capturing apparatus comprising:

an apparatus frame;

a capturing system for capturing the image, the capturing system being secured to the apparatus frame;

an illumination system coupled to the apparatus frame, the illumination system generating a first generated light beam having a first color composition; and a control system that controls the operation of the illumination system so that the first color composition of the first generated light beam mimics a first color content of at least one of candlelight, fire, moonlight, stage light and fireworks.

19. The image capturing apparatus of claim 18 wherein the illumination system alternatively generates a second generated light beam having a second color composition that is different than the first color composition, and wherein the control system controls the operation of the illumination system so that the second color composition of the second generated light beam mimics a second color content of at least one of candlelight, fire, moonlight, stage light and fireworks.

20. The image capturing apparatus of claim 19 wherein the illumination system alternatively generates a third generated light beam having a third color composition that is different than the first color composition and the second color composition, and wherein the control system controls the operation of the illumination system so that the third color composition of the third generated light beam mimics a third color content of at least one of candlelight, fire, moonlight, stage light and fireworks.

* * * * *